UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

BLUE-RED AZO DYE.

SPECIFICATION forming part of Letters Patent No. 468,142, dated February 2, 1892.

Application filed July 11, 1891. Serial No. 399,242. (Specimens.) Patented in England November 19, 1889, No. 18,517; in France February 12, 1890, No. 203,744, and in Germany October 20, 1890, No. 54,116.

*To all whom it may concern:*

Be it known that I, MORITZ ULRICH, doctor of philosophy, residing at Elberfeld, in the Empire of Germany, assignor to the FARBEN-FABRIKEN, VORMALS FR. BAYER & CO., have invented a new and valuable Improvement in the Manufacture of Dye-Stuffs, (for which the aforesaid FARBENFABRIKEN has already obtained Letters Patent in Germany, No. 54,116, dated October 20, 1890; in France No. 203,744, dated February 12, 1890, and in England, No. 18,517, dated November 19, 1889,) of which the following is a specification.

My invention relates to the production of a new bluish-red azo coloring-matter of the formula

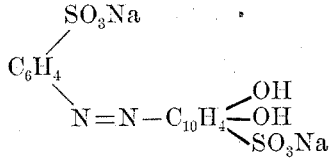

by the combination of paramido-benzol-sulphonic acid with the dihydrooxynaphthaline-mono-sulpho-acid of my Letters Patent No. 444,679, dated January 13, 1891.

In carrying out my invention I proceed in the following manner: 17.3 kilos of paramido-benzol-sulphonic acid are diazotized with hydrochloric acid in the common manner by seven kilos of sodium nitrite. The resulting diazo compound is then caused to flow into a watery acetic-acid solution of 26.2 kilos of the above-mentioned sodium salt of the dihydrooxynaphthaline-mono-sulpho-acid in the presence of sodium acetate. Instead of an acetic-acid solution and instead of sodium acetate an alkaline solution (carbonate of soda or soda) may be employed. After standing for about twelve hours the production of the coloring-matter is completed, the acetic acid is neutralized with carbonate of soda or caustic alkali, and the new dye-stuff separated by the addition of common salt. After having been filtered off and dried the new product forms a violet-red amorphous powder of the formula:

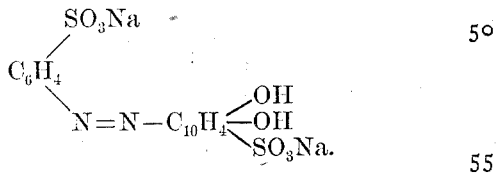

It is easily soluble in water with bluish-red color. It dissolves in a solution of sodium carbonate and of ammonia with bluish-red color. When dissolved in concentrated sulphuric acid, a deep violet-blue solution results. My new azo coloring-matter dyes unmordanted wool in sulphuric-acid baths exceedingly pure and clear red shades similar to those of acid magenta. On wool mordanted with chromium salts it dyes dull violet.

What I claim as my invention, and desire to secure by Letters Patent, is—

1. The process of producing the new coloring-matter herein described, which consists in acting with the diazo compound or paramido-benzol-sulphonic acid on the dihydrooxy-naphthaline-mono-sulpho-acid described in my Letters Patent No. 444,679, dated January 13, 1891, in solution, as above described.

2. The coloring-matter hereinbefore described, which is derived from the diazo derivative of the paramido-benzol-sulphonic acid with the dihydrooxynaphthaline-mono-sulpho-acid of my Letters Patent No. 444,679, dated January 13, 1891, and which is readily soluble in water with bluish-red color in solutions of sodium carbonate and of ammonia with the same color, besides dissolving in concentrated sulphuric acid with deep violet-blue color.

In testimony whereof I have signed my name in presence of two subscribing witnesses.

MORITZ ULRICH.

Witnesses:
 WM. ESSENWEIN,
 RUDOLPH FRICKE.